(No Model.)
L. D. APPLEMAN.
TELEPHONE TRANSMITTER.
No. 572,188. Patented Dec. 1, 1896.
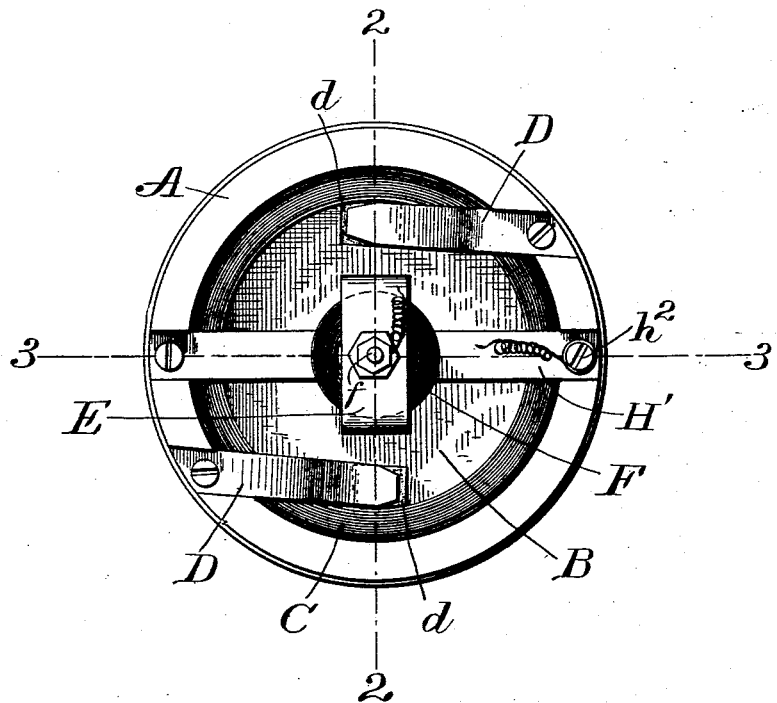
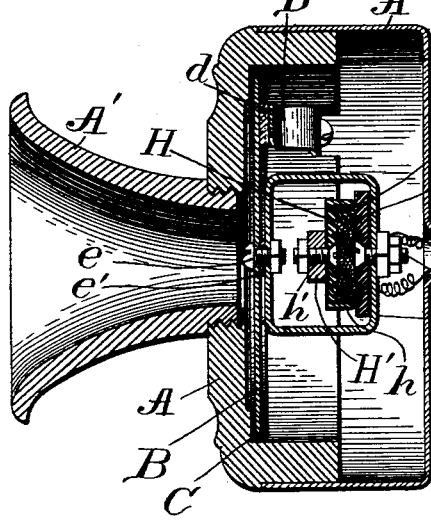
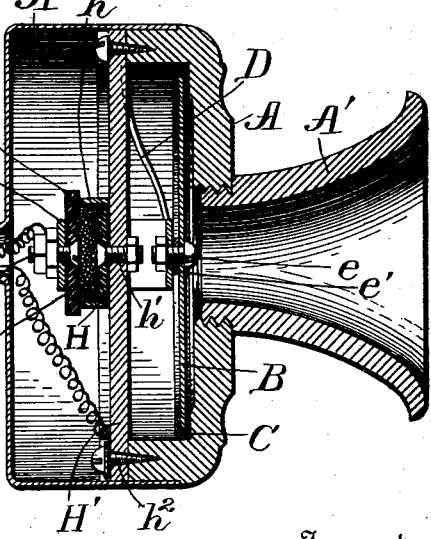
Witnesses
Percy C. Bowen.
J. Stephen Giusta.
Inventor
L. D. Appleman,
by Whitman & Wilkinson,
Attorneys.

UNITED STATES PATENT OFFICE.

LOUIS D. APPLEMAN, OF WAYNESBOROUGH, VIRGINIA, ASSIGNOR OF ONE-HALF TO W. NEVINS FISHBURNE, OF SAME PLACE.

TELEPHONE-TRANSMITTER.

SPECIFICATION forming part of Letters Patent No. 572,188, dated December 1, 1896.

Application filed March 19, 1896. Serial No. 583,967. (No model.)

*To all whom it may concern:*

Be it known that I, LOUIS D. APPLEMAN, a citizen of the United States, residing at Waynesborough, in the county of Augusta and State of Virginia, have invented certain new and useful Improvements in Telephone-Transmitters; and I do hereby declare the following to be a full, clear, and exact description of the invention, such as will enable others skilled in the art to which it appertains to make and use the same.

My invention relates to improvements in telephone-transmitters; and it consists in an improved form of granule transmitter and in certain novel features hereinafter described and claimed.

Hitherto it has been the custom in telephone-transmitters of similar construction to mount the movable electrode between the diaphragm and the fixed electrode, whereby the grains of carbon or other conducting material held between the electrodes are compressed by the motion of the diaphragm away from the mouthpiece of the telephone. This manner of arranging the electrodes was presumably based upon the theory that the vibrations of the membrane or diaphragm resembled those of a vibrating string, the amplitude on either side of the position of rest being practically the same. I have ascertained by experiment that the amplitude of the vibration is much greater on one side of the diaphragm than on the other, and that the amplitude is greatest on the side opposite to that from which the sound-waves or other impulses strike the diaphragm.

By constructing a telephone in which the electrode carried by the diaphragm moves away from the fixed electrode during the vibration from the speaker a much greater range of the undulation of the current is secured and fine differences between sound-waves are more accurately transmitted. This feature has been brought out in my prior application, entitled "Improvements in transmitters," filed May 25, 1895, and serially numbered 550,639, in which case weighted conducting-pencils were used; and it is the object of this present invention to show this theory as applied to granule transmitters, where the undulations in the current are produced by compressing granular masses of conducting material, preferably carbon.

A further advantage of having the movable electrode move away from the fixed electrode during the greatest vibrations is that the carbon or other granule conducting material held between the electrodes is thereby rendered less liable to become packed due to the extreme pressure produced by the strongest impulses of the diaphragm. It will also be seen that the entire surface of the movable electrode moves backward through the same distance away from the fixed electrode, giving equal freedom to the entire granular surface at each vibration of the diaphragm. The amplitude of vibration of the diaphragm being greatest at its center, and in other forms of transmitters the granular surface being directly exposed to the surface of the diaphragm, it will be seen that the granules nearest the periphery receive little or no freedom at each motion of the diaphragm, and owing to the inaction of the granules they settle and become packed. Again, the contact between the electrodes when granules are used is sufficient, as a rule, to carry full flow of current before any motion of the diaphragm takes place. Hence in the other forms of transmitters, where the diaphragm is forced by the sound-wave more heavily against the granules, that part of the energy expended for increasing the flow, or at least that part expended after full flow is reached, is simply lost and the wave cannot be perfectly recorded. In such cases the instrument fails to reproduce accurately minute variations of the sound-waves, which are necessary to the perfect operation of the instrument.

The said invention will be understood by reference to the accompanying drawings, in which the same parts are indicated by the same letters throughout the several views.

Figure 1 represents a view of the diaphragm and movable electrode as seen from the left of Fig. 3, the back $A^2$ of the case being removed. Fig. 2 represents a section along the line 2 2 of Fig. 1 and looking to the right, and Fig. 3 represents a section along the line 3 3 of Fig. 1 and looking down.

The case A is provided with the mouthpiece A' and the back A², constructed in the usual way.

B represents the diaphragm, which is mounted in the ring C, made of vulcanite or other suitable non-conducting material.

The diaphragm B and ring C are held in place by the springs D, secured in the case A and bearing on small blocks $d$ of cork or light material interposed between the ends of said springs and the diaphragm; or any other convenient way of holding the diaphragm in place may be adopted, if desired.

E represents the bridge or frame, connected by the bolt $e$ with the diaphragm B, separated therefrom by the washer $e'$. This frame E carries the movable electrode F, which is preferably corrugated on its face, as shown, and bears on the powdered carbon G, which carbon is inclosed between the fixed electrode H and the movable electrode F and is surrounded by an exterior ring $h$ of thin paper or rubber or other suitable material to prevent the particles of carbon from falling out of position.

The movable electrode F is secured by the binding-post $f$ to the bridge or frame E, while the fixed electrode H is secured by the bolt $h'$ to the conducting-bar H', provided with a binding-post $h^2$. The conducting-wires are connected to these binding-posts $f$ and $h^2$, as shown in Figs. 1 and 3.

By an inspection of Figs. 2 and 3 it will be seen that the vibrations of the diaphragm away from the speaker will cause the entire surface of the movable electrode F to move away from the electrode H in perfect unison with that point of the diaphragm (the center) having the greatest amplitude of vibrations. Hence it will be seen, first, that the greatest possible variation is produced over the entire surface of the movable electrode F, and, second, that the free motion of the diaphragm away from the speaker not being hampered there is no brake or impedance placed upon the sound-waves, but they are allowed to act to their fullest extent, while in returning to its initial position the resiliency of the diaphragm will compress the carbon granules G, thus causing the instrument to register sound through a wide range and to note minor variations thereof. This feature is originally described in my application Serial No. 550,639 and is believed to be broadly new in the art and is claimed as such.

Having thus described my invention, what I claim, and desire to secure by Letters Patent of the United States, is—

1. In a telephone-transmitter, the combination with a diaphragm, a fixed electrode, and an electrode attached to said diaphragm and an interposed granular conducting mass, of means operated by said diaphragm for causing the entire surface of the electrode attached thereto to move away from the granular mass during the vibration of the diaphragm away from the speaker, and to approach the same during the vibration of diaphragm toward the speaker, substantially as described.

2. In a telephone-transmitter, the combination with a diaphragm and an electrode moving therewith, of a second electrode fixed between said diaphragm and said first electrode, and a granular conducting mass interposed between said electrodes, substantially as described.

3. In a telephone-transmitter, the combination with a diaphragm and an electrode connected thereto and moving therewith, said electrode being in the form of a corrugated carbon disk, of a second electrode, also corrugated and interposed between the diaphragm and the first electrode, and a granular mass interposed between said electrodes, substantially as described.

4. In a telephone-transmitter, the combination with a diaphragm and an open bridge or frame carried thereby, of an electrode mounted in the interior of said bridge or frame, a second electrode inclosed by said bridge or frame, and granular conducting material interposed between said electrodes and adapted to be compressed as the diaphragm returns to its normal position, substantially as described.

5. In a telephone-transmitter, the combination with a diaphragm, of a bridge or frame carried thereby, a corrugated carbon electrode mounted on the interior of said bridge or frame farthest from said electrode, a second corrugated carbon electrode fixed between the first electrode and the diaphragm, and granular conducting material held between said electrodes, substantially as described.

6. In a telephone-transmitter, the combination with a diaphragm, of a bridge or frame carried thereby, a corrugated carbon electrode mounted on the interior of said bridge or frame farthest from said electrode, a second corrugated carbon electrode fixed between the first electrode and the diaphragm, and powdered carbon held between said electrodes, substantially as described.

7. In a telephone-transmitter the combination of a diaphragm, an electrode moving therewith, and a second electrode interposed between the diaphragm and the first electrode, and granular carbons adapted to form a more perfect electrical connection between the two electrodes during the return of the diaphragm from the limit of vibration away from the speaker to its normal position, substantially as described.

In testimony whereof I affix my signature in presence of two witnesses.

LOUIS D. APPLEMAN.

Witnesses:
G. E. LAYMAN,
W. A. RIFE.